T. A. GOSKAR.
APPARATUS FOR DRYING COAL OR OTHER MATERIAL.
APPLICATION FILED OCT. 29, 1921.

1,424,565.

Patented Aug. 1, 1922.
8 SHEETS—SHEET 1.

T. A. GOSKAR.
APPARATUS FOR DRYING COAL OR OTHER MATERIAL.
APPLICATION FILED OCT. 29, 1921.

1,424,565.

Patented Aug. 1, 1922.
8 SHEETS—SHEET 4.

Inventor
T. A. Goskar
by Wilkinson & Giusta,
Attorneys.

Fig. 12.

UNITED STATES PATENT OFFICE.

THOMAS A. GOSKAR, OF SWANSEA, WALES.

APPARATUS FOR DRYING COAL OR OTHER MATERIAL.

1,424,565.  Specification of Letters Patent.  Patented Aug. 1, 1922.

Application filed October 29, 1921. Serial No. 511,389.

*To all whom it may concern:*

Be it known that I, THOMAS AUGUSTUS GOSKAR, a subject of the King of Great Britain, residing at Salisbury Chambers, 15 and 16 Wind Street, Swansea, in the county of Glamorgan, South Wales, have invented a certain new and useful Apparatus for Drying Coal or Other Material (for which an application has been filed in Great Britain Oct. 1, 1920, #27,881), of which the following is a specification.

This invention refers to a new or improved apparatus for drying—or more or less approximately drying—coal, sand, grain, granulated slag, ashes, or other material in a granular or percolatable body or mass form, or this invention may be employed for extracting the moisture from a bituminous emulsion where such has been added to or mixed with powdered coal for the purpose of making patent fuel.

Now according to my present invention apparatus for drying coal, or ashes, or other material in a granular or percolatable mass form in an upright and continuous column, having an upright chamber adapted to hold therein the material to be dried in the form of a column as aforesaid and having the walls of said chamber perforated or adapted to permit heated air or gases to pass freely therethrough is characterized by the fact (a) that the said walls of said upright chamber downwardly diverge from one another, (b) that means are provided to cause the heated air or heated gases for drying the material to be passed through said material while in said column form in said chamber by induction and not forced therethrough by pressure (c) that the said heated air or gases pass through the natural interstices or spaces between the particles of the said mass of material in column form and without the mechanical provision of channels or passages through said mass for said heated air or gases to pass therethrough and (d) said heated air or gases (at any suitable temperature) is or are from a common supply which is applied to the said column (in the heating zone thereof) and at all levels of said column (in said heating zone) at the same or approximately the same temperature; and is further characterized by other features and details of construction all as hereinafter fully described, and finally pointed out in the claims.

I will now describe apparatus according to my present invention with reference to the accompanying drawings which represent various alternative arrangements according to my invention; like letters of reference indicate like parts, or parts performing similar functions throughout.

In the said accompanying drawings:—

Fig. 9 is a vertical sectional view and

Fig. 11 is a vertical sectional view and

Figure 1:
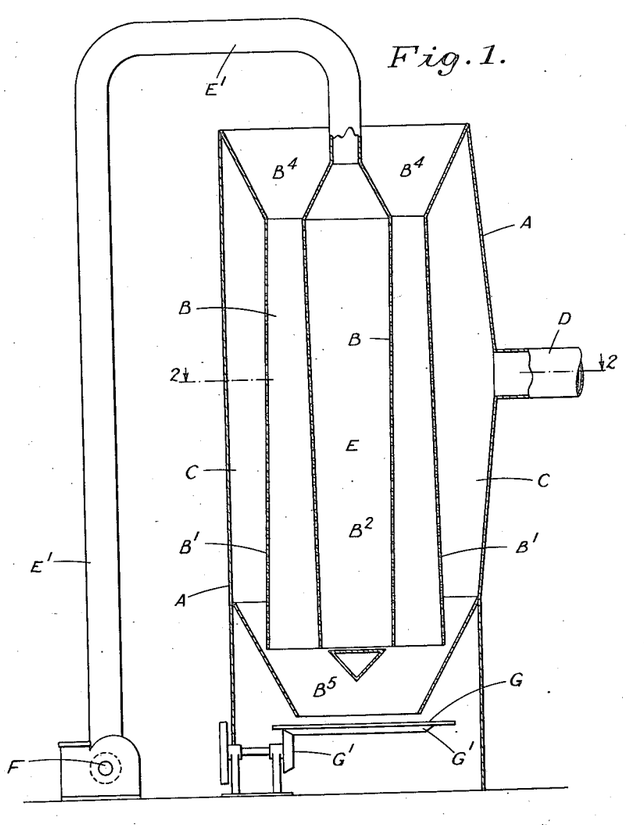
Fig. 1 is a vertical section through the centre of an apparatus, for drying powdered coal and like material having a granular or percolatable body or mass form, according to this invention.
Figure 2:
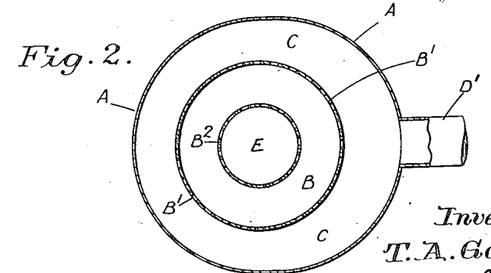
Fig. 2 is horizontal cross-sectional view on the line 2—2 Fig. 1.

Referring particularly to Figs. 1 and 2 A is the substantially cylindrical air-tight outer casing.

$B^1$ and $B^2$ are two concentrically arranged perforated metal walls of the inner casing (which walls $B^1$ $B^2$ are each perforated or formed with interstices) forming the annular chamber B slightly conical in form, into which chamber B the material to be dried is fed from the annular funnel $B^4$ and travelling (by gravity) down said chamber B the material passes out into the funnel $B^5$ from which it drops on to the revolvable table G which is rotated by any suitable means through the bevel gear $G^1$; or any other suitable means may be employed for discharging the dried material.

C is an annular chamber formed between the outer wall of the inner casing $B^1$ and the interior wall of the outer casing A.

Heated gases are supplied to the chamber C through the pipe D and are drawn through the perforations or interstices of the walls $B^1$ $B^2$ and through (and in direct contact with) the material contained there between and into the chamber E and thence exhausted through the exhaust pipe $E^1$ by the action of the fan F.

Figure 3:
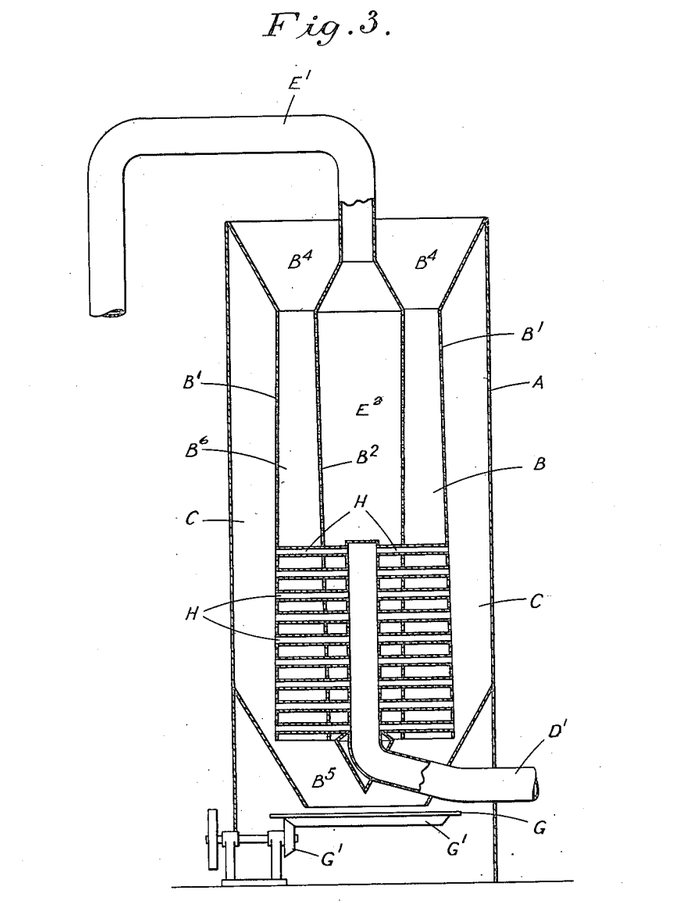
Fig. 3 is a vertical sectional view of an alternative arrangement.

In the arrangement shown in Fig. 3 the heated air or heated gases is or are admitted near the bottom of the apparatus through the pipe $D^1$ and are then drawn through the radially disposed tubes or flues H which pass through the material containing chamber $B^6$, into the surrounding chamber C, whence said heated gases are drawn through—and in direct contact with—the material in the upper part of the chamber $B^6$ into the chamber $E^2$ and exhausted through the pipe $E^1$ by the fan F as aforesaid.

Figure 4:
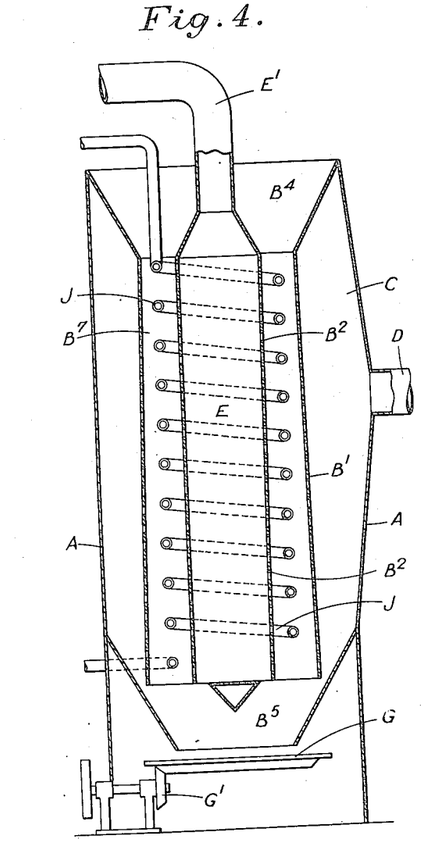
Fig. 4 is a similar view to Fig. 1 with the addition of a steam coil.

In Fig. 4 a steam coil J is positioned in the material containing chamber $B^7$ to cause extra heating of the material passing through said chamber $B^7$ for the purpose aforesaid.

Figures 5, 6:
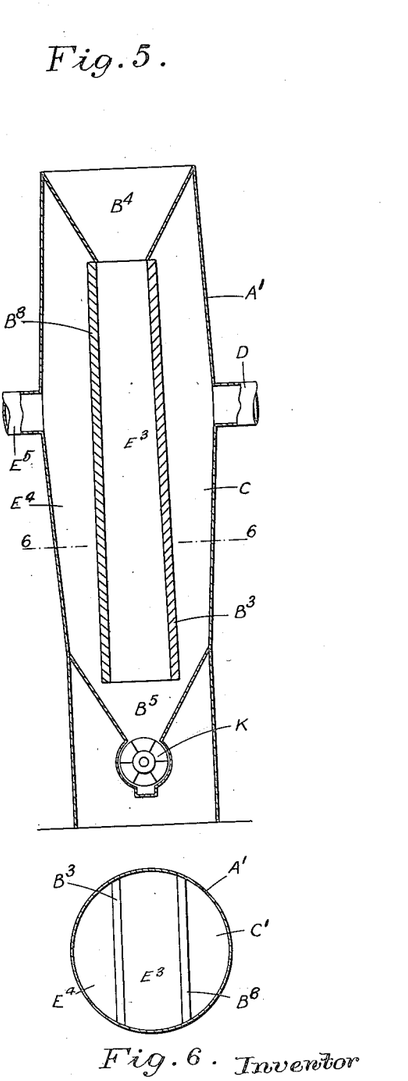
Fig. 5 is a vertical sectional view of an alternative arrangement.
Fig. 6 is a horizontal cross-sectional view thereof on line 6—6 Fig. 5.

In Figs. 5 and 6, the material-containing chamber $B^8$ is not circular in horizontal cross-section but extends completely across the outer casing $A^1$ as shown in Fig. 6, thus dividing the interior of the casing $A^1$ into three compartments viz $E^3$, $C^1$ and $E^4$.

The walls of said material chamber $B^8$ are formed of inwardly and downwardly extending slats or bars of iron or any suitable metal forming louvers fixed in position in any suitable manner—for example as hereinafter described with reference to Figs. 11 and 14 and 15. In this arrangement the heated gases are admitted to the chamber or compartment $C^1$ through the pipe D and are thence drawn through said material containing chamber $E^3$ (through the interstices between said bars or slats of chamber $B^8$) and through the material in said chamber $E^3$ into the chamber or compartment $E^4$, whence they are exhausted through the pipe $E^5$. K is a rotatory measurer or delivery device (of well-known type) to withdraw the material from the apparatus; or a revolving table such as aforesaid or any other suitable means may be employed as aforesaid.

Figure 7:
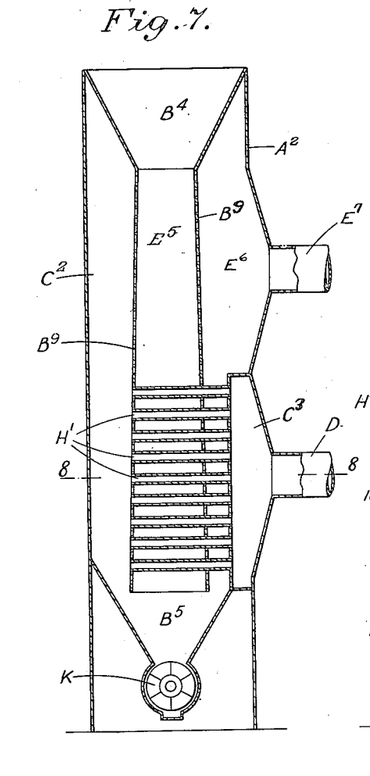
Fig. 7 is a vertical sectional view of another arrangement.
Figure 8:
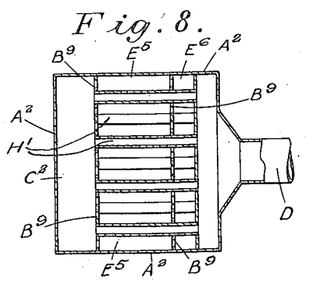
Fig. 8 is a horizontal cross-section on line 8—8 of Fig. 7.

In the arrangement shown in Figs. 7 and 8 the upright outer casing $A^2$ is rectangular—or substantially rectangular—in cross-section; and the upright inner casing (forming the chamber $E^5$ for holding the material to be dried) is of rectangular form in cross-section and is formed by the two walls $B^9$ $B^9$ which are perforated or provided with interstices, these walls $B^9$ $B^9$ extending right across the interior of the outer casing $A^2$ so as to form the separate compartments $C^2$ and $E^6$ on opposite sides of the inner casing $E^5$.

$H^1$ $H^1$ are the horizontal tubes or flues extending across the chamber $E^5$ (as before described) and into the chamber $C^3$.

The heated air or heated gases is or are supplied through the pipe D into the chamber $C^3$ and thence pass through the horizontal tubes or flues $H^1$ into the compartment $C^2$ and thence the hot gases etc. are drawn through the material in the chamber $E^5$ into the compartment $E^6$ and exhausted from the latter through the exhaust pipe $E^7$ as hereinbefore described.

K is rotatory measurer or delivery device (of well-known type) for use as aforesaid.

Figure 9:
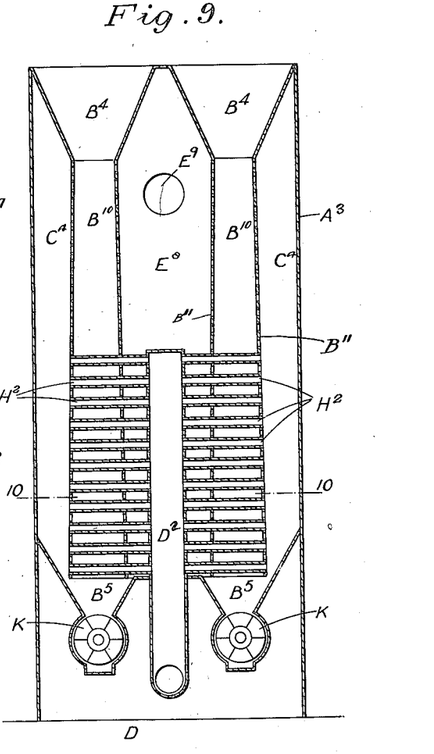
Figure 10:
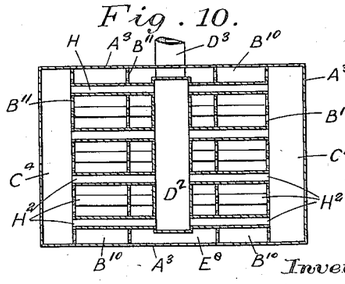
Fig. 10 is a horizontal cross-sectional view on line 10—10 of Fig. 9 showing another alternative arrangement.

In Figs. 9 and 10 the air tight outer casing $A^3$ is of rectangular shape in cross-section and two separate material containing chambers $B^{10}$ of rectangular form in cross-section are arranged inside said outer casing $A^3$; the walls $B^{11}$ of each said chamber $B^{10}$ being perforated or provided with interstices as before explained and these said walls extending right across the interior of said outer casing; these two inner casings forming said two chambers $B^{10}$ being spaced apart on their side faces from one another and from the outer casing so as to thereby form a separate compartment $C^4$ between each said inner casing and the wall of the outer casing and another separate compartment E between the two said chambers $B^{11}$.

$H^2$ $H^2$ are the horizontal tubes or flues extending from the centrally disposed local chamber $D^2$ into the respective chambers $C^4$ $C^4$.

The heated air or heated gases is or are supplied through the pipe $D^3$ into the centrally disposed chamber $D^2$ and thence passed through the horizontal tubes or flues $H^2$ into either one or other of the two said compartments $C^4$ and thence the hot gases etc. are drawn through the material in the chambers $B^{10}$ into the central compartment $E^8$ and exhausted from the latter through the exhaust pipe $E^9$ as hereinbefore described.

K is rotatory measurer or delivery device at the bottom of each separate chamber $B^{10}$ for use as aforesaid.

Figure 11:
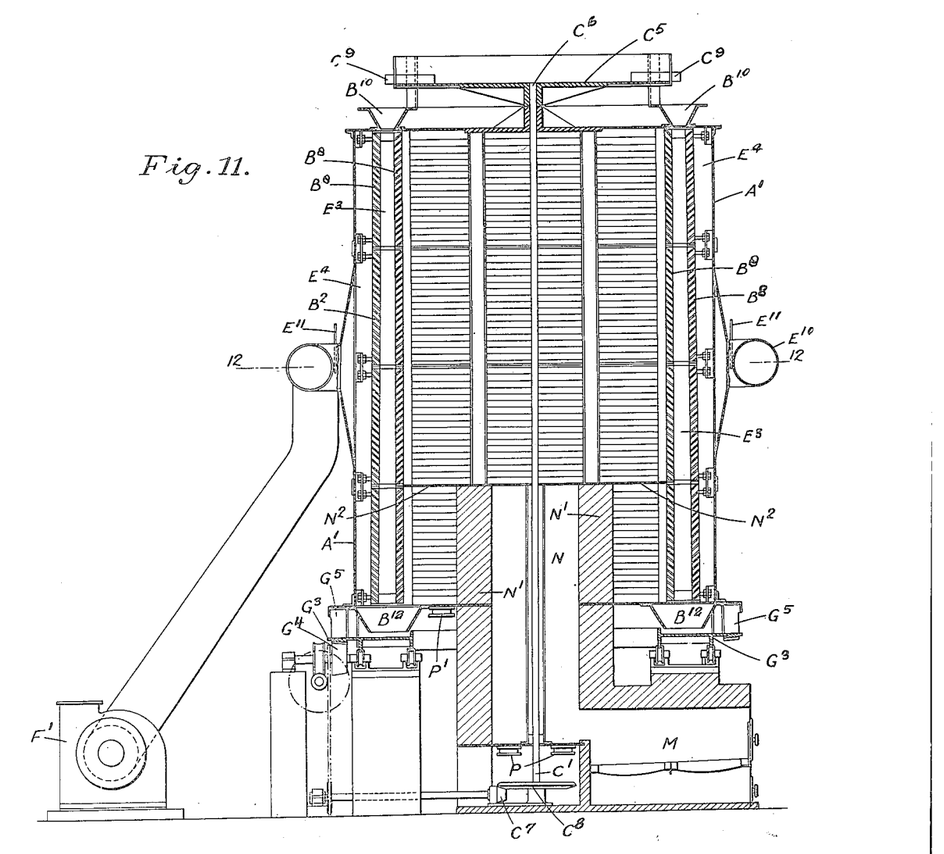
Figure 12:
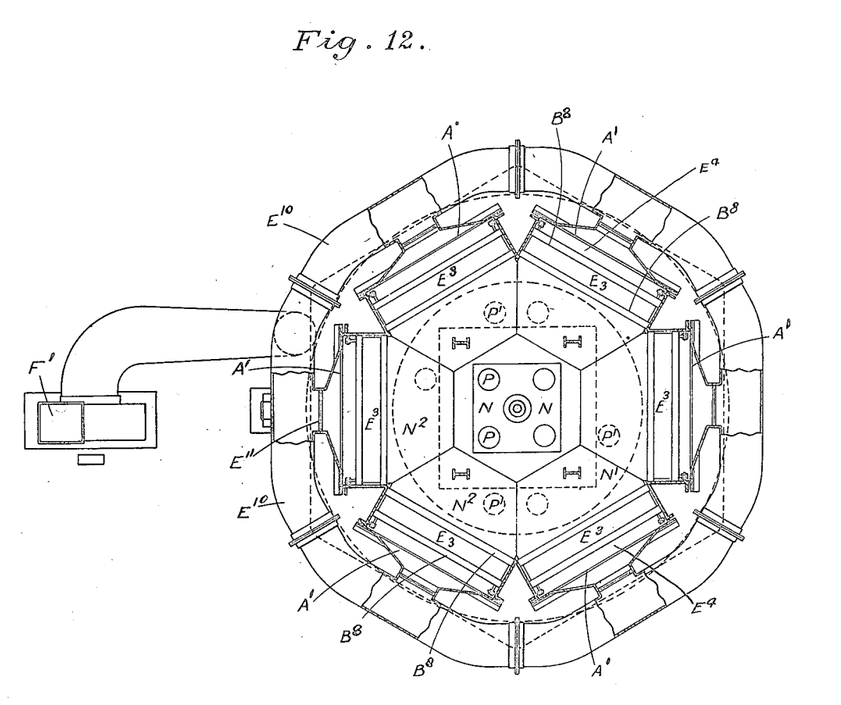
Fig. 12 is a horizontal cross-section, on line 12—12 of Fig. 11, of another arrangement according to the invention in which means are provided to cool the dried material before the latter emerges from the apparatus.

In the arrangement shown in Figs. 11 and 12 a plurality of drying chambers $E^3$ are arranged to form a polygon around a central flue adapted to receive the heated gases from a furnace, each of said drying chambers comprising an inner or material containing chamber and a corresponding outer chamber $E^4$ in which a partial vacuum is created by a fan or other suitable means adapted to exhaust the air from each of said outer chambers through a pipe extending completely around the apparatus and into which each said outer chamber $E^4$ opens as hereafter described.

This arrangement of apparatus is designed to be used when it is desirable that the temperature of the material (dried in this apparatus) should be comparatively low when it is withdrawn from said apparatus.

In these Figs. 11 and 12:—

$A^1$ is the outer casing of each said drying chamber.

$E^3$ $E^3$ are the drying chambers through which the material to be dried passes downwardly between the gridlike walls or louvres $B^8$ and $B^8$ which are formed of slats or bars of iron or other suitable metal. The chambers $E^3$ $E^3$ are advantageously slightly wider at their lower than at their upper ends and are so formed to permit the material to pass freely downwardly therein without liability of jamming.

The material to be dried is fed in any suitable manner on to the revolvable table $C^5$ which, when rotated by means of the spindle $C^6$ and the bevel gear $C^7$ $C^8$, driven by any suitable means causes said material to be scraped therefrom by fixed scrapers $C^4$ into the hoppers or funnels $B^{10}$, and passing downwardly through said chambers $E^3$ $E^3$ the material emerges into the funnels $B^{12}$ which are advantageously formed larger in cross-section than said chambers $E^3$ $E^3$ to thereby catch any of said material which may have escaped through the said gridlike walls $B^8$ and $B^8$. The material then drops onto the revolvable table $G^3$ rotated by any suitable means through the bevelled gear $G^4$ and as the table is revolved said material is scraped therefrom by fixed scrapers $G^5$.

The heated gases (for drying the material) comprising the products of combustion of fuel in the furnace M pass directly into the central vertical flue N and thence emerge into the main flue or space enclosed by the inner walls $B^8$ of the drying chambers $E^3$ $E^3$. Openings P which may be controlled by valves are provided to admit to said central flue N cold air e. g. air at atmospheric temperature for cooling purposes thereby to regulate the temperature of the heated gases from the furnace M. By means of the fan $F^1$ the air is exhausted from the outer chambers $E^4$ through the pipe $E^{10}$, the area of the opening from each of said outer chambers $E^4$ into the pipe $E^{10}$ being controlled by a valve $E^{11}$ thereby to regulate the partial vaccum in each said outer chamber $E^4$.

The heated gases are drawn into said main flue (above the aforesaid central flue N) and thence through the interstices of the gridlike walls $B^8$ and $B^8$ and through the material there-between.

For the purpose of preventing the heated gases passing through the material in the lower part of the drying chambers $E^3$ (i. e. just before said material emerges from said drying chambers $E^3$) the said lower part of each said drying chamber is divided off level with the top of the central flue N by the horizontally disposed partition plates $N^2$ which extend from the walls $N^1$ of the central flue N outwardly to the grid walls $B^8$. Openings $P^1$ which may be controlled by valves are provided to admit cool air (e. g. air at ordinary atmospheric temperature) to said lowermost portion of each said drying chamber $E^3$ to be drawn through the material passing through such lowermost portion, thereby cooling said material and driving off any loose or vapourized moisture contained therein, just before said dried material emerges from the bottom of each said drying chamber $E^3$.

Figure 13:
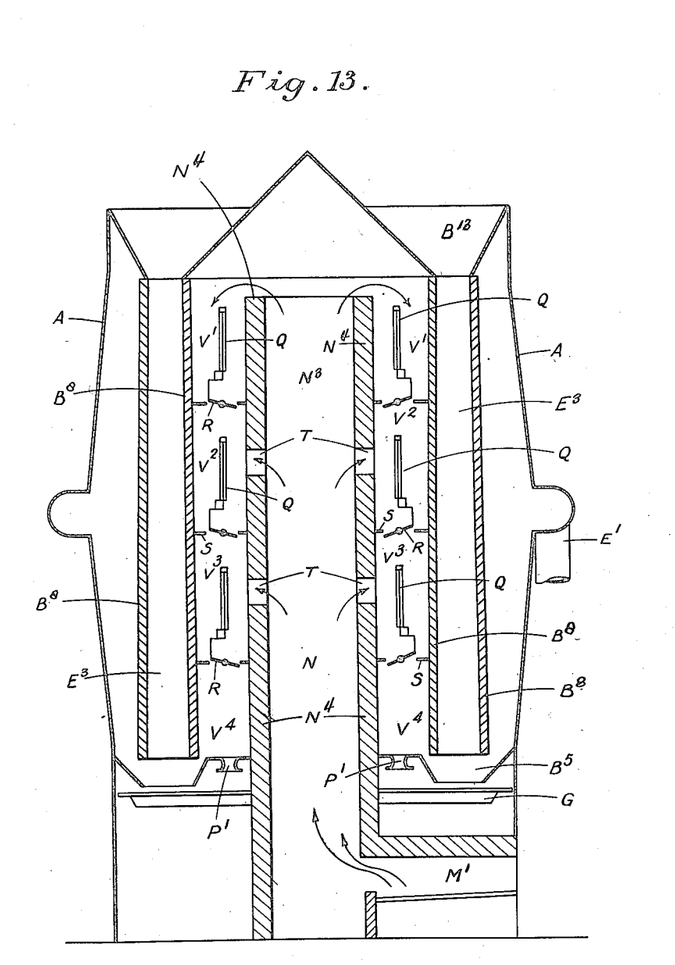
Fig. 13 is a vertical sectional view of still another arrangement of apparatus according to my invention.

In the arrangement illustrated in Fig. 13, a central flue $N^3$, having an opening at its lower end communicating with the furnace $M^1$, extends upwardly in the centre of the apparatus to near the top thereof. The surrounding chamber thus formed between the wall $N^4$ and the gridlike wall $B^8$ of the drying chamber $E^3$ is horizontally divided into sections $V^1$, $V^2$, $V^3$, $V^4$, of which the sections $B^2$ and $V^3$ have openings T to said central flue $N^3$, the section $V^4$ being provided with an opening or openings $P^1$ controlled if desired by a valve for the purpose of admitting cool air (e. g. atmospheric air) to said section $V^4$. The sections $V^1$, $V^2$ and $V^3$, are provided with suitable means e. g. thermostats Q adapted automatically to control valves R in the horizontal partitions S thereby to regulate the temperature in each of said sections by admitting cool air from said section $V^4$ to each section above in succession.

The direction of the flow of heated gases is shown by the arrows in the drawing.

Thus the material fed into the annular chamber $E^3$ through the funnel $B^{13}$ is subjected to heating and drying gases of the highest required temperature when passing the uppermost of said sections viz $V^1$ and thereafter subjected to gases of lower and lower temperature in succession as said material passes sections $V^2$, $V^3$, and finally as said material passes section $V^4$ cold air alone is drawn through said material to cool the latter and remove the vapours etc. therefrom as aforesaid.

Figure 14:
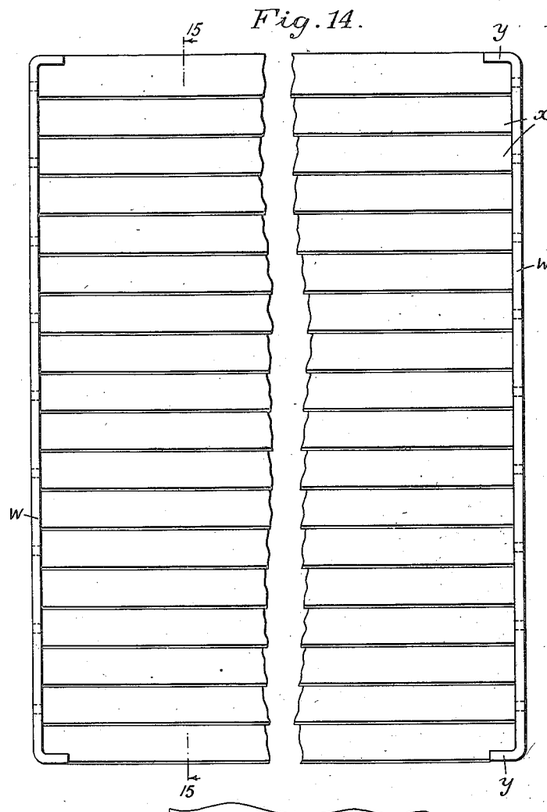
Fig. 14 is a side elevation of one of the grids forming the louvred walls of the drying chamber shown in Fig. 13.
Figure 15:
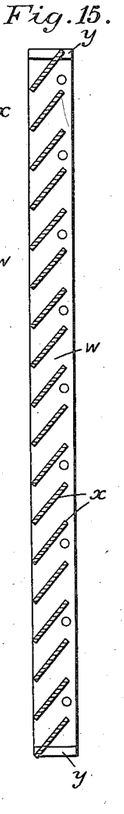
Fig. 15 is a vertical sectional view on the line 15—15 of Fig. 14.

Referring now to Figs. 14 and 15, each grid comprises two stout metal plates W forming the vertical end walls or supports to which are fixedly secured a series of superposed flat slats or bars X each disposed in a slanting direction (e. g. at an angle of 45°) and spaced equidistant apart (or otherwise if desired) from top to bottom the whole being firmly secured together so as to form one complete unit which can be affixed in position and secured in any suitable manner and by any suitable means such as screw bolts or the like.

Figure 16:
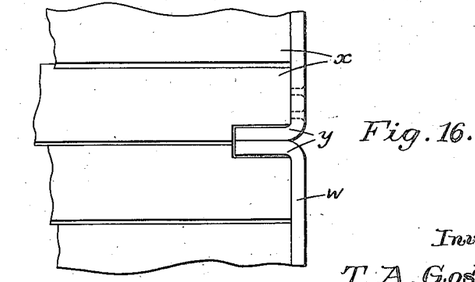
Fig. 16 is a local view of the junction of two adjoining sections of the grids.

The top and bottom of each said end member W of each unit may advantageously be bent inwardly or formed at right angles as at Y to thereby afford a seating or support for receiving thereon the next grid or section above same; see Fig. 16 which is a local view of the junction of two adjoining sections.

What I claim is:—

1. Apparatus for drying coal or ashes or other material in a granular percolatable mass form in an upright and continuous column; comprising in combination, an upright chamber, adapted to hold therein the said material in the form of an upright column, having the walls of said chamber arranged to diverge downwardly from one another and provided with a profusion of openings therethrough; an outer casing enclosing said upright drying chamber; an enclosed space on each side of the said drying chamber; means to deliver the drying medium into said enclosed space so that it can be applied at a common temperature to the said column of material at all levels of said column in the heating zone; and means to pass said drying medium by induction through the interstices between the particles of the said mass of material to be dried, substantially as set forth.

2. Apparatus for drying coal or ashes or other material in a granular percolatable mass forming in an upright and continuous column; comprising in combination, an upright chamber, adapted to hold therein the said material in the form of an upright column, having the walls of said chamber arranged to diverge downwardly from one another and provided with a profusion of openings therethrough; an outer casing enclosing said upright drying chamber; an enclosed space on each side of the said drying chamber; means to deliver the drying medium into said enclosed space so that it can be applied at a common temperature to the said column of material at all levels of said column in the heating zone; means to pass said drying medium by induction through the interstices between the particles on the said mass of material to be dried; and means for cooling the heated and dried material just before it emerges from the drying chamber, such cooling means comprising a cold air chamber adjoining the lower portion of said drying chamber, into which cold air chamber the heated drying medium is prevented from entering, openings to admit into this last-named chamber air from the outside atmosphere to enable same to be passed by induction through the heated material in said lower portion of said drying chamber, substantially as set forth.

3. Apparatus for drying coal or ashes or other material in a granular or percolatable mass form in an upright and continuous column; comprising in combination, an upright chamber, adapted to hold therein the said material in the form of an upright column, having the walls of said chamber arranged to diverge downwardly from one another and provided with a profusion of openings therethrough; an outer casing enclosing said upright drying chamber; an enclosed space on each side of the said drying chamber; means to deliver the drying medium at a common temperature into one such space; means to pass said drying medium by induction through the interstices between the particles of the said mass of material to be dried; means for cooling the heated and dried material just before it emerges from the drying chamber, such cooling means comprising a cold air chamber adjoining the lower portion of said drying chamber, into which cold air chamber the drying medium is prevented from entering, openings to admit into this last-named chamber air from the outside atmosphere to enable same to be passed by induction through the heated material in said lower portion of said drying chamber; and means to deliver the drying medium from said common supply in zones of graduated temperatures to the material to be dried in said apparatus, said last-named delivery means comprising a series of separated superposed chambers arranged above the aforesaid cold air chamber and interposed between the aforesaid drying chamber and the aforesaid space into which said common supply of drying medium is delivered at a comon temperature, controlled openings between each adjoining pair of said superposed chambers and between the cold air chamber and the superposed chamber next above it, valves to control said openings, and a pyrometer in each said superposed chamber arranged to automatically regulate the said valves and openings to thereby automatically and separately regulate the temperature of the drying medium in each said superposed chamber respectively, substantially as set forth.

T. A. GOSKAR.